United States Patent
Dey et al.

(10) Patent No.: US 10,255,549 B2
(45) Date of Patent: *Apr. 9, 2019

(54) CONTEXT-BASED PHOTOGRAPHY AND CAPTIONS

(71) Applicant: International Business Machines Corporation, Armonk, NY (US)

(72) Inventors: Kuntal Dey, New Delhi (IN); Seema Nagar, Bangalore (IN); Srikanth G. Tamilselvam, Chennai (IN); Enara C. Vijil, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,774

(22) Filed: Jan. 27, 2017

(65) Prior Publication Data

US 2018/0218258 A1   Aug. 2, 2018

(51) Int. Cl.
*G06K 9/00*  (2006.01)
*G06N 3/08*  (2006.01)
(Continued)

(52) U.S. Cl.
CPC .......... *G06N 3/08* (2013.01); *G06K 9/00288* (2013.01); *G06K 9/00624* (2013.01);
(Continued)

(58) Field of Classification Search
CPC .. G06N 3/08; G06K 9/00288; G06K 9/00624; G06K 9/6263; G06Q 50/01;
(Continued)

(56) References Cited

U.S. PATENT DOCUMENTS 8,347,213 B2  1/2013 Clifton et al.
8,494,851 B2  7/2013 DeLuca et al.
(Continued)

FOREIGN PATENT DOCUMENTS

WO    2015120413 A1    8/2015

OTHER PUBLICATIONS

Xie et al. "Robust Detection of Hyper-local Events from Geotagged Social Media Data", Aug. 2013, ACM, Proceedings of 13th Int. Workshop on Multimedia Data Mining, article No. 2, p. 1-9.*
(Continued)

*Primary Examiner* — Vincent Rudolph
*Assistant Examiner* — Timothy Choi
(74) *Attorney, Agent, or Firm* — Christopher K. McLane

(57) ABSTRACT

In an approach to managing images and captions, one or more computer processors receive one or more captured images of including one or more subjects. The one or more computer processors identify the one or more subjects from the first image. The one or more computer processors identify the context of the first image of the one or more captured images containing the one or more subjects. The one or more computer processors analyze one or more social networking histories and relationships associated with the one or more subjects using recognition techniques. The one or more computer processors create one or more captions associated with the first image of the one or more captured images based on the social networking histories and relationships of the one or more subjects and the identified context of the first image of the one or more captured images containing the one or more subjects.

20 Claims, 3 Drawing Sheets

(51) Int. Cl.
*H04L 29/06* (2006.01)
*G06Q 50/00* (2012.01)
*H04L 29/08* (2006.01)
*G06K 9/62* (2006.01)
*G06N 99/00* (2019.01)

(52) U.S. Cl.
CPC ....... *G06K 9/00677* (2013.01); *G06K 9/6263* (2013.01); *G06Q 50/01* (2013.01); *H04L 63/20* (2013.01); *H04L 67/10* (2013.01); *H04L 67/22* (2013.01); *H04L 67/306* (2013.01); *G06K 2209/27* (2013.01); *G06N 99/005* (2013.01)

(58) Field of Classification Search
CPC ......... H04L 63/20; H04L 67/10; H04L 67/22; H04L 67/306
See application file for complete search history.

(56) References Cited

U.S. PATENT DOCUMENTS

| | | | |
|---|---|---|---|
| 8,555,154 B2 | 10/2013 | Chen et al. | |
| 9,405,964 B1 | 8/2016 | Suchland et al. | |
| 9,940,576 B1* | 4/2018 | Dey | H04L 63/20 |
| 2003/0108241 A1 | 6/2003 | Colmenarez et al. | |
| 2012/0166285 A1* | 6/2012 | Shapiro | G06Q 30/0251 |
| | | | 705/14.58 |
| 2012/0213404 A1* | 8/2012 | Steiner | G06F 17/30256 |
| | | | 382/103 |
| 2013/0038756 A1 | 2/2013 | Cheng | |
| 2014/0244744 A1* | 8/2014 | Lyren | G06Q 50/01 |
| | | | 709/204 |
| 2015/0099586 A1 | 4/2015 | Huang et al. | |
| 2015/0156177 A1 | 6/2015 | Murphy et al. | |
| 2016/0189414 A1 | 6/2016 | Baker et al. | |
| 2016/0267321 A1 | 9/2016 | Liu et al. | |
| 2017/0115853 A1 | 4/2017 | Allekotte et al. | |
| 2017/0132821 A1 | 5/2017 | Villiani et al. | |
| 2017/0140249 A1* | 5/2017 | Lee | G06K 9/00677 |
| 2017/0270970 A1* | 9/2017 | Ho | G11B 27/036 |
| 2018/0189260 A1 | 7/2018 | Kannan et al. | |
| 2018/0197098 A1 | 7/2018 | Subbian et al. | |

OTHER PUBLICATIONS

Rabbath et al., "Analysing Facebook Features to Support Event Detection for Photo-Based Facebook Applications", Jun. 2012, ACM, Proceedings of the 2nd Int. Conf. on Multimedia Retrieval, article No. 11, p. 1-8.*
Wang et al., "Social Event Detection with Interaction Graph Modeling", Nov. 2012, ACM, Proceedings of the 20th ACM Int. Conf. on Multimedia, p. 865-868.*
Dey et al., "Context-Based Photography and Captions", U.S. Appl. No. 15/705,816, filed Sep. 15, 2017, 27 pages.
Appendix P, List of IBM Patents or Patent Applications Treated as Related, 2 pages, dated Sep. 18, 2017.

* cited by examiner

CONTEXT-BASED PHOTOGRAPHY AND CAPTIONS

BACKGROUND OF THE INVENTION

The present invention relates generally to the field of deep machine learning, and more particularly to deep machine learning applied to social networking function including the capturing, uploading, and captioning of images.

Deep learning is a branch of machine learning based on a set of algorithms that are designed to model high level abstractions in data by using a deep graph with multiple processing layers, composed of multiple linear and non-linear transformations. Deep learning is part of a broader family of machine learning methods based on learning representations of data. An observation, such as an image, can be represented in many ways, such as a vector of intensity values per pixel, or in a more abstract way such as a set of edges, and regions of particular shape. Some representations are better than others at simplifying the learning task, such as face recognition or facial expression recognition. One of the uses of deep learning is replacing handcrafted features with efficient algorithms for unsupervised or semi-supervised feature learning and hierarchical feature extraction. Research in this area attempts to make better representations and create models to learn these representations from large-scale unlabeled data. Various deep learning architectures such as deep neural networks, convolutional deep neural networks, deep belief networks and recurrent neural networks have been applied to fields like computer vision, automatic speech recognition, natural language processing, audio recognition and bioinformatics where they have been shown to produce state-of-the-art results on various tasks.

SUMMARY

Embodiments of the present invention disclose a method, a computer program product, and a system for managing captured images and captions using deep machine learning. The method includes one or more computer processors receiving one or more captured images of one or more subjects, wherein a first image of the one or more images includes one or more subjects. The one or more computer processors identify the one or more subjects from the first image. The one or more computer processors identify the context of the first image of the one or more captured images containing the one or more subjects. The one or more computer processors analyze one or more social networking histories and relationships associated with the one or more subjects using facial recognition techniques and object recognition techniques. The one or more computer processors create one or more captions associated with the first image of the one or more captured images based on the social networking histories and relationships of the one or more subjects and the identified context of the first image of the one or more captured images containing the one or more subjects.

DETAILED DESCRIPTION

Present day social networking using social media platforms requires active input by users to create content by uploading pictures and tagging photos with appropriate posts or captions. Therefore, current technologies rely on user directed inputs to ensure the correct execution of the posting of photographs and associated captions. As such, social networking using social media platforms can benefit from the integration of context-based machine learning in everyday social networking activities. Applying context-based machine learning to social media platforms allows for significant improvements in the way people engage in social media. For example, allowing programs to choose which photographs to upload to social media and which captions to associate with the photographs allows for a user to engage in social media in an organic manner that passively complements the user's lifestyle rather than being a time and labor intensive endeavor. Further, using context-based machine learning expands the capabilities of social networking by respectively managing multiple social media platforms and social networks for the user without necessitating repetitive user actions to separately post updates to each social media platform. Embodiments of the present invention recognize that machine learning can complement present day social media platforms in making social media presence and everyday interactions and activities seamlessly connected. Implementation of embodiments of the invention may take a variety of forms, and exemplary implementation details are discussed subsequently with reference to the Figures.

Figure 1:
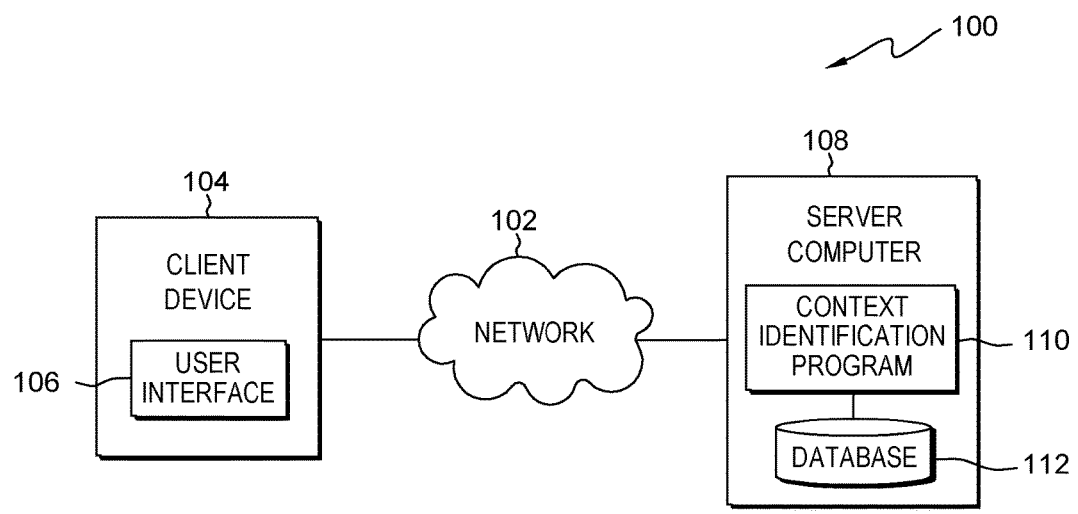
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104 and server computer 108, and other computing devices (not shown) within distributed data processing environment 100.

Client device 104 can be a smart watch, a smart television, a laptop computer, a tablet computer, a smart phone, or any programmable electronic device capable of capturing images and communicating with various components and devices within distributed data processing environment 100, via network 102. Client device 104 may receive direct input from the user via user interface 106, which may include input for managing supervised learning activities. Client device 104 may represent any programmable electronic device, pre-configured electronic device, or combination of programmable and pre-configured electronic devices capable of executing machine readable program instructions and communicating with other computing devices (not shown) within distributed data processing environment 100 via a network, such as network 102. In an embodiment, client device 104 may be limited to communicating with other computing devices (not shown) within distributed data processing environment 100 via a network, such as network 102. In the depicted embodiment, client device 104 includes an instance of user interface 106. In another embodiment, client device 108 does not include an instance of user interface 106.

User interface 106, hosted on client computing device 104, provides an interface to context identification program 110 on server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of unmanned imaging vehicle 104 and computer 108. Mobile application software, or an "app," is a computer program designed to run on smart phones, tablet computers and other mobile devices. User interface 106 enables the user of client computing device 104 to register with and configure context identification program 110 to adjust preferences for context-based posts on social networking, such as which photographs to post, which times context identification program 110 may run, which social networks to post to, and the general tone of captions for particular social networks on particular social media platforms. However, user interface is not limited to the aforementioned examples and may be used to control any parameters associated with context identification program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with client computing device 104 and other computing devices (not shown) within distributed data processing environment 100 via network 102. For example, server computer 108 may be a smart phone that is capable of remotely controlling and sending registration and configuration data to client computing device 104. In another embodiment, server computer 108 represents a computing system utilizing clustered computers and components (e.g., database server computers, application server computers, etc.) that act as a single pool of seamless resources when accessed within distributed data processing environment 100. Server computer 108 includes context identification program 110 and database 112. Server computer 108 may include internal and external hardware components, as depicted and described in further detail with respect to FIG. 3.

Context identification program 110 executes a series of steps to identify the context of one or more images captured by client device 104 to discern the social, emotional, and informational context of the one or more images and upload the images and context specific captions to one or more social media platforms. Context identification program 110 aims to streamline and automate much of the synthesis of content and management required to keep up with social media in a variety of contexts. In doing so, context identification program 110 saves a user time and effort by autonomously taking photographs and applying one or more captions to the images. Further, context identification program 110 functions to autonomously manage social networks, business networks, and any other networks without user input, which may more efficiently manage the relationships and communication of information between individuals in multiple networks. For example, context identification program 110 may decrease the time a user must engage in social media by orders of magnitude when context identification program 110 takes an image of the user in a winter scene and automatically uploads the image with customized captions for each network, such simultaneously uploading the photo one caption wishing happy holidays to a family network and another caption reminding customers to buy winter clothing at a clothing store the user owns.

Further, context identification program 110 identifies one or more subjects. Subjects may include, but are not limited to, one or more users, one or more people, one or more places, one or more objects, and any combination of the one or more people, the one or more places, and the one or more objects. Context identification program 110 captures one or more images of the one or more subjects. After capturing the one or more images, context identification program 110 identifies the one or more subjects of the captured image. Context identification program 110 analyzes the social history and relationships of the identified one or more subjects. Context identification program 110 creates one or more captions for the captured one or more images based on the prior analysis. Context identification program 110 determines the social networking entities associated with the one or more subjects. If context identification program 110 has permission to upload the one or more captured images and associated captions to the determined social networking entities associated with the one or more subjects, then context identification program 110 uploads the captured one or more images and associates captions to each respective social network. If context identification program 110 does not have permission to upload the one or more captured images and associated captions to one or more social networking entities, then context identification program 110 requests permission to upload the one or more captured images and associated captions to social networks. If context identification program 110 receives permission by a user to upload the one or more captured images and associated captions to social networks, then context identification program 110 uploads the one or more captured images and associated captions to each respective social network. If context identification program 110 does not receive permission to upload the one or more captured images and associated captions to social networks, then context identification program 110 deletes the one or more captured images and associated captions.

Database 112 is a repository for data used by context identification program 110. In the depicted embodiment, database 112 resides on server computer 108. In another embodiment, database 112 may reside elsewhere within distributed data processing environment 100 provided context identification program 110 has access to database 112. Database 112 can be implemented with any type of storage device capable of storing data and configuration files that can be accessed and utilized by server computer 108, such as a database server, a hard disk drive, or a flash memory. In some embodiments, database 112 may store any data that context identification program 110 uses to identify the context of captured images and create captions associated with the captured images. For example, database 112 may store parameters set by a user that give context identification program 110 permission to capture images, create captions, and upload the images and associated captions to various social networking entities. In various embodiments, database 112 may store data received by context identification program 110 and registration information including configuration data of context identification program 110 and client computing device 104. Examples of registration data include, but are not limited to, data identifying user preferences for which images and captions context identification program 110 may capture, create, or upload. For example, a user may input user preferences that do not allow context identification program 110 to capture, create, or upload any posts related to negative emotions such as sadness or anger. In another example, a user may input user preferences that do not allow context identification program 110 to capture create or upload any posts involving extracurricular activities to social media networks associated with school. However, the aforementioned examples serve to illustrate a few scenarios, and the user preferences can be in the form of any restrictions and allowances a user may input.

Figure 2:
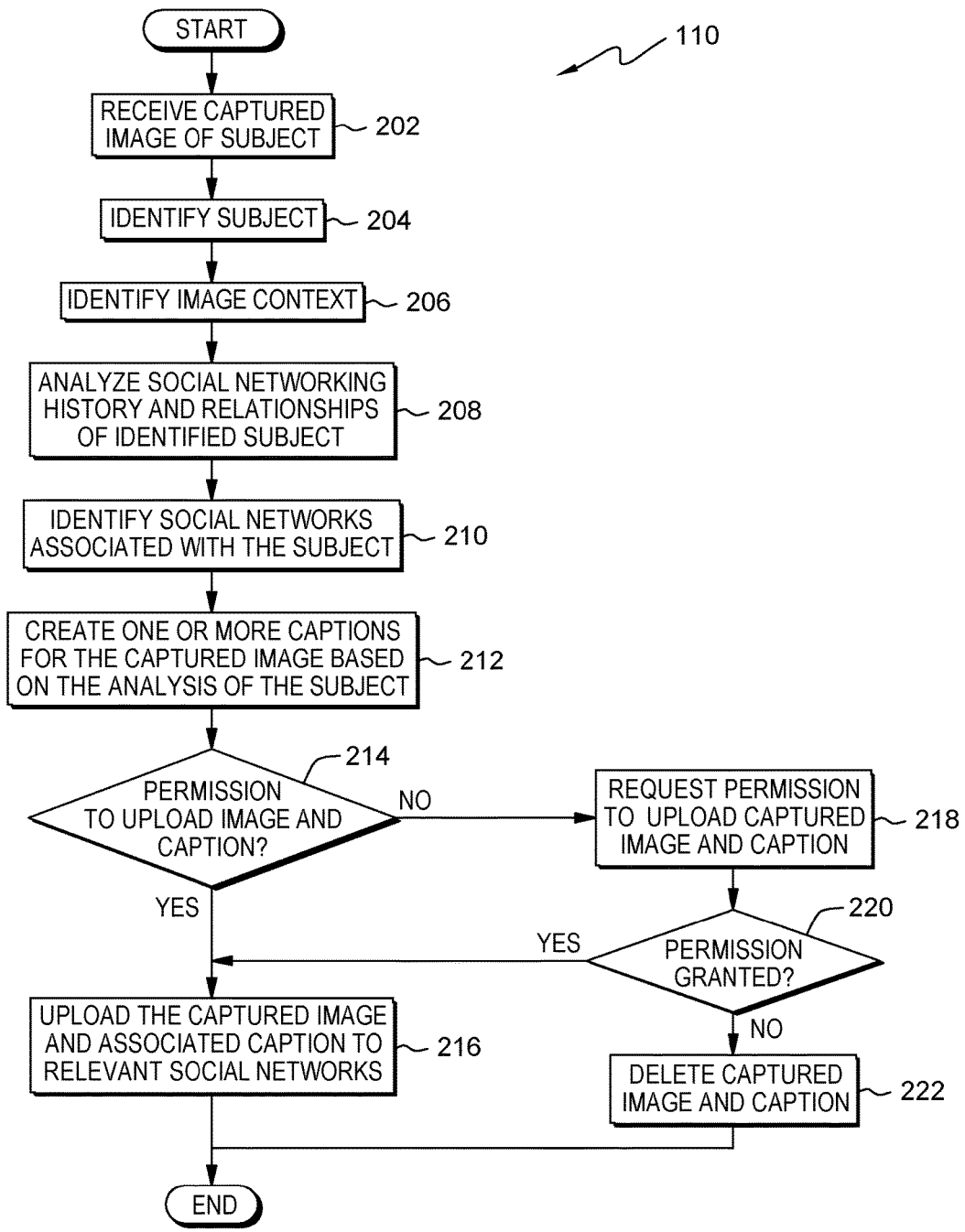
FIG. 2 is a flowchart depicting operational steps of a context identification program, on a server computer within the distributed data processing environment of FIG. 1, for managing captured images and captions using deep machine learning, in accordance with an embodiment of the present invention.

FIG. 2 depicts operational steps for identifying the context of images, creating captions, and uploading the captured images and created captions to social networks, on a computing device within the computing environment of FIG. 1, in accordance with an embodiment of the present invention. FIG. 2 is a flowchart depicting operations of an instance of context identification program 110 on server computer 108 within distributed data processing environment 100. The operational steps of FIG. 2 begin when context identification program 110 identifies a subject. FIG. 2 as described herein is based on the operational steps of context identification program 110 located outside of client computing device 104. However, alternative embodiments and configurations may execute the operational steps of context identification program 110.

Context identification program 110 receives a captured image of the subject (step 202). A captured image may be in the form of a photograph or a video. In an embodiment, context identification program 110 receives an image from an independent imaging device that captures images of subjects and sends the images to context identification program 110 through network 102. For example, context identification program 110 may receive an image from a fixed camera outside a home that sends captured images to context identification program 110 through network 102. In another embodiment, context identification program 110 may receive an image from a camera associated with a computing device, such as a smart phone, tablet, and computer. For example, context identification program 110 may receive a photograph taken by a user of computing device 104, such as a smart phone. In yet another embodiment, context identification program 110 receives a video from an independent imaging device that captures videos of subjects and sends the videos to context identification program 110 through network 102. For example, context identification program 110 may receive a video from a fixed camera outside a home that sends the video to context identification program 110 through network 102.

Context identification program 110 identifies a subject (step 204). Context identification program 110 may employ a variety of recognition techniques such as pattern recognition, facial recognition, three-dimensional recognition, skin texture analysis, and thermal cameras. For example, context identification program 110 may identify five subjects out of a photograph using facial recognition techniques and identify a plurality of books with similar covers which will allow context identification program 110 to identify the group as a book club. Context identification program may also discern certain subjects out of a larger variety of subjects using the aforementioned recognition techniques. Subjects may include one or a combination of people, places, and things. In some embodiments, context identification program 110 identifies multiple subjects at once. For example, context identification program 110 may identify two people. In another example, context identification program 110 may identify one person as the first subject and the location of the person as the second subject. In yet another example, context identification program 110 may identify one person as the first subject and an object as the second subject. In another embodiment, context identification program 110 may identify subjects in a video. For example, context identification program 110 may analyze every frame of a video as a separate image and identify each subject appearing in a video. In another embodiment, context identification program 110 may detect when changes occur in the number or type of subjects in the video and pick out one or more frames to analyze for subjects. For example, context identification program 110 may identify actions, such as the leaving and entering of subjects in a video, and select particular frames of the video for analysis.

Context identification program 110 identifies the context of the image (step 206). Context identification program 110 may identify the context of the image using deep machine learning. In an embodiment, context identification program 110 may use supervised learning classifiers and regression analysis to analyze current and historical facts about a user to make predictions about user social networking preferences and behavior which allows context identification program 110 to identify the context of the image based on the social networking behavior of a user. For example, context identification program 110 may use a regression analysis to estimate the relationship among variables, such as subjects, tone, and facial recognition data of an image of a user and a professor hugging and smiling with black robes on. As a result, context identification program 110 may determine that the relationship between the subjects is formal given the academic relationship, the tone of the image is celebratory given the hugging and smiling present in the photograph, and the event is a graduation given the presence of graduation robes on both the user and the professor.

Additionally, the context of the image may include one or more characteristics of the image subjects. In another example, context identification program 110 may use supervised learning classifiers to analyze image subjects based on labeled training examples to categorize the relationship between subjects and identify the mood of an image of a user and a professor hugging and smiling with black robes on. As a result, context identification program 110 may determine that the relationship between the subjects is academic in nature because of the presence of a professor and black robes based on object and facial recognition data which associates with an academic designation in the professions category. Additionally, context identification program 110 may determine that the relationship between the subjects is formal in nature because the presence of black robes associated with a formal designation in the relationships category. Lastly, context identification program 110 may determine that the tone is happy based on the facial recognition data which identifies two smiles in the image which associates with a happy designation in the mood category.

In another embodiment, context identification program 110 may identify the expressions of one or more people, the characteristics of the seasons, and the times of day individually or in combination to determine the general tone of a photograph. For example, context identification program 110 may identify the smile of two subjects in the image and determine that the mood is one of happiness. In another embodiment, context identification program 110 identifies the context of multiple images in order to identify the moods associated with a larger collection of content such as photo albums or videos.

Context identification program 110 may be restricted from identifying certain subjects, certain locations, certain times of the day, and any other identifiable characteristic by a user of client computing device 104. For example, a user of context identification program 110 may restrict context identification program 110 from identifying subjects in a classified location, such as a government facility. In another example, context identification program 110 may be restricted from identifying the context of images between the hours of 10:00 P.M. and 7:00 A.M. in order to protect the privacy of the subjects of the images captured by client computing device 104.

Context identification program 110 analyzes the social history and relationships of identified subjects to each other and a user of context identification program 110 (step 208). For example, context identification program 110 may identify that a user of context identification program 110 and a person identified in a captured image have a particular social connection after analyzing the social history between the identified person and the user. For example, context identification program 110 may identify that the user of context identification program 110 and a person identified in a captured image both participated in the high school debate team. Context identification program 110 may analyze past social media post content, pictures, social media groups, relationship statuses, as well as any other means available to determine the relationship between one or more subjects. In another example, context identification program 110 may identify that the season represented in the captured image is the fall and analyze the user's particular connection to the fall season. In yet another example, context identification program 110 may identify an object, such as a bicycle, and associate the bicycle with the user after identifying defining characteristics particular to the user's bicycle.

Context identification program 110 identifies one or more social networks associated with the subject (step 210). In an embodiment, context identification program 110 identifies social networks through the social networking entities the user associates with. For example, context identification program 110 may identify large social networking websites the user logs into. In another embodiment, context identification program 110 may identify user predetermined social circles through proprietary websites, such as business websites, that the user associates with by looking for tags a user may place on social media networks based on the characteristics of the social networks. For example, context identification program 110 may be given instructions by a user to associate the user with a website associated with a business and the clients associated with the business.

Context identification program 110 creates one or more captions for the captured image based on the analysis on the subject (step 212). In the depicted embodiment, context identification program 110 creates one or more captions based on the past posts by a user associated with particular tones such as happy, sad, and playful. Further, context identification program may use recognition techniques and natural language processing technologies to compare new content with pre-existing content on the internet to determine the mood of a particular photograph and create a caption. Additionally, in various embodiments, context identification program 110 may use deep machine learning techniques, such as regression analysis and supervised learning classifiers, to create captions based on an analysis of the subjects and the characteristics of one or more networks associated with a user. Context identification program 110 may also use user preset captions to act as source material for synthesizing new captions. In another embodiment, context identification program 110 creates a caption for a captured image based on the social networks that a user belongs to and the identified context of the image. For example, context identification program 110 may determine that a captured image contains a user and a friend from high school from the debate team sharing a happy moment by using facial recognition techniques and analyzing the relationship history between the user and the friend on one or more social networking websites. As a result, context identification program 110 creates the caption "Debate team members finally meet again!". In this example, the caption indicates the social relationship between the individuals and the happy tone of the photograph by the inclusion of an exclamation point. In another example, client computing device 104, captures an image of the leaves beginning to change color to yellow, orange, and red hues. As a result, context identification program 110 creates two captions based on the social networks that a user belongs to, such as a large social networking website and a business network associated with the user, stating "Autumn is my favorite season!" and "Brace yourself. Winter is coming. Buy warm sweaters today!"

In yet another embodiment, context identification program 110 may create a caption based on a regression analysis identifying the relationship between one or more variables such as subject relationships and tone of the one or more images. For example, a regression analysis may categorize the relationship between the subjects in an image as formal given the academic relationship, the tone of the image as celebratory given the hugging and smiling present in the photograph, and the event as a graduation given the presence of graduation robes on both the user and the professor. As a result, context identification program 110 may create a first caption stating "All the years of hard work finally paid off!" as a celebratory post on a social network and a second caption stating "Law Graduate 2017. I couldn't do it without the support of the amazing faculty" striking a deferential tone on the university professional network.

In yet another embodiment, context identification program 110 may create a caption based on a supervised learning classifiers identifying the categories the one or more subjects fall within, such as subject relationships and tone of the one or more images. For example, context identification program 110 may use supervised learning classifiers to determine that designations associated with the relationship between the subjects associates with the academic classifier based on the presence of a professor and black robes, the formal classifier based on the presence of black robes, and the happy classifier based on the presence of two smiles in the image.

Context identification program 110 determines whether context identification program 110 has the user's permission to upload images and captions on behalf of the user (decision block 214). In an embodiment, a user inputs specific social networks that context identification program 110 can upload images and captions to. In another embodiment, a user inputs specific times of the day that context identification program 110 can upload images to social networks. For example, a user may prohibit context identification program 110 from uploading images and captions to business networks from 11:00 P.M. to 7:00 A.M. but allow context identification program 110 to upload images and captions to social networks at any hour.

Responsive to context identification program 110 having permission to upload images and captions on the user's behalf ("Yes" branch, decision block 214), context identification program 110 uploads the one or more captured images and associated captions to one or more social networks (step 216). For example, context identification program 110 may upload "Autumn is my favorite season!" to a social networking website and ""Brace yourself. Winter is coming. Buy warm sweaters today!" to a social network associated with a clothing business.

Responsive to context identification program 110 not having permission to upload images and captions on the user's behalf ("No" branch, decision block 214), context identification program 110 requests permission to upload the one or more captured images and associated caption to one or more social networks (step 218). In an embodiment, context identification program 110 may request permission via user interface 106 on client computing device 104. In another embodiment, context identification program 110 may request permission via email. However, context identification program 110 is not limited to the aforementioned embodiments and may request permission through any available means.

Responsive to context identification program 110 receiving permission to upload images and captions on the user's behalf ("Yes" branch, decision block 220), context identification program 110 uploads the one or more captured images and associated captions to one or more social networks (step 216). For example, context identification program 110 may upload "Autumn is my favorite season!" to a social networking website and ""Brace yourself. Winter is coming. Buy warm sweaters today!" to a social network associated with a clothing business.

Responsive to context identification program 110 not receiving permission to upload images and captions on the user's behalf ("No" branch, decision block 220), context identification program 110 deletes any captured images and captions associated with the user (step 222). In another embodiment, a user may set an expiration time period after context identification program 110 requests permission before context identification program 110 determines that the user does not grant permission to upload one or more images and associated captions to one or more social networks. For example, a user may set the time period as 1 hour. If context identification program 110 does not receive permission within an hour of requesting permission, then context identification program 110 deletes the one or more captures images and associated captions.

Figure 3:
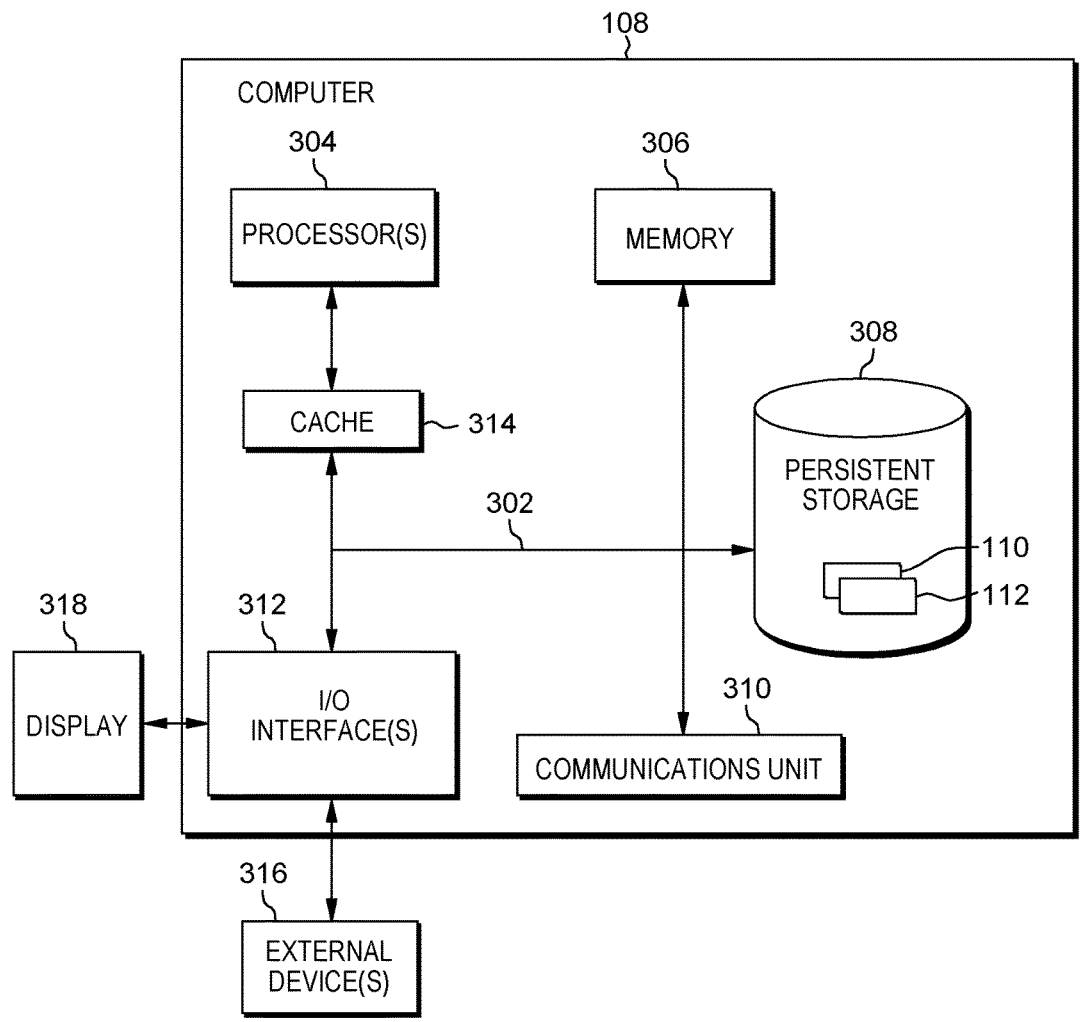
FIG. 3 depicts a block diagram of components of the server computer executing the context identification program within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., context identification program 110 and database 112, are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104. In these examples, communications unit 310 includes one or more network interface cards. Communications unit 310 may provide communications through the use of either or both physical and wireless communications links. context identification program 110, database 112, and other programs and data used for implementation of the present invention, may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., context identification program 110 and database 112 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing captured images and captions using deep machine learning, the method comprising:
   receiving, by one or more computer processors, one or more captured images of one or more subjects, wherein a first image of the one or more images includes one or more subjects;
   identifying, by the one or more computer processors, the one or more subjects from the first image;
   identifying, by the one or more computer processors, a social and emotional context of the first image of the one or more captured images containing the one or more subjects;
   analyzing, by the one or more computer processors, one or more social networking histories and relationships associated with the one or more subjects using facial recognition techniques and object recognition techniques;
   identifying, by one or more computer processors, the relationship between the one or more identified subjects and a tone of the first image, wherein the tone is based on the social and emotional context of the first image;
   performing, by one or more computer processors, regression analysis on the identified relationship to categorize the relationship between one or more identified subjects and the tone for the image; and
   creating, by the one or more computer processors, one or more captions associated with the first image of the one or more captured images based on the social networking histories and relationships of the one or more subjects and the identified context of the first image of the one or more captured images containing the one or more subjects and the performed regression analysis.

2. The method of claim 1, further comprising:
   determining, by the one or more computer processors, whether permission exists to upload the first image of the one or more captured images of one or more subjects from the first image and the one or more captions associated with the first image of the one or more captured images to one or more networks.

3. The method of claim 2, further comprising:
   responsive to determining that permission to upload the first image of the one or more captured images of the one or more subjects from the first image and the one or more captions associated with the first image of the one or more captured images does exist, uploading, by the one or more computer processors, the first image of the one or more captured images of the one or more subjects from the first image and the one or more captions associated with the first image of the one or more captured images to relevant social networks.

4. The method of claim 1, wherein the social networking histories and relationships of the one or more subjects and the identified context of the first image of the one or more captured images containing the one or more subjects are determined using a supervised learning classifier.

5. The method of claim 1, wherein the social networking histories and relationships of the one or more subjects and the identified context of the first image of the one or more captured images containing the one or more subjects are determined using a regression analysis.

6. The method of claim 1, wherein the social networking histories and relationships of the one or more subjects and the identified context of the first image of the one or more captured images containing the one or more subjects are determined by analyzing the history of the one or more identified subjects using one or more past social network posts in one or more similar situations.

7. The method of claim 1, wherein the one or more subjects are selected from a group consisting of: one or more users, one or more people, one or more places, one or more objects, and any combination of the one or more people, the one or more places, and the one or more objects.

8. A computer program product for managing captured images and captions using deep machine learning, the computer program product comprising:
   one or more computer readable storage devices and program instructions stored on the one or more computer readable storage devices, the stored program instructions comprising:
   program instructions to receive one or more captured images of one or more subjects, wherein a first image of the one or more images includes one or more subjects;
   program instructions to identify the one or more subjects from the first image;
   program instructions to identify a social and emotional context of the first image of the one or more captured images containing the one or more subjects;
   program instructions to analyze one or more social networking histories and relationships associated with the one or more subjects using facial recognition techniques and object recognition techniques;
   program instructions to identify the relationship between the one or more identified subjects and a tone of the first image, wherein the tone is based on the social and emotional context of the first image;
   program instructions to perform regression analysis on the identified relationship to categorize the relationship between one or more identified subjects and the tone for the image; and program instructions to create one or more captions associated with the first image of the one or more captured images based on the social networking histories and relationships of the one or more subjects and the identified context of the first image of the one or more captured images containing the one or more subjects and the performed regression analysis.

9. The computer program product of claim 8, further comprising:
program instructions to determine whether permission exists to upload the first image of the one or more captured images of one or more subjects from the first image and the one or more captions associated with the first image of the one or more captured images to one or more networks.

10. The computer program product of claim 9, further comprising:
responsive to determining that permission to upload the first image of the one or more captured images of the one or more subjects from the first image and the one or more captions associated with the first image of the one or more captured images does exist, program instructions to upload the first image of the one or more captured images of the one or more subjects from the first image and the one or more captions associated with the first image of the one or more captured images to relevant social networks.

11. The computer program product of claim 8, wherein the social networking histories and relationships of the one or more subjects and the identified context of the first image of the one or more captured images containing the one or more subjects are determined using a supervised learning classifier.

12. The computer program product of claim 8, wherein the social networking histories and relationships of the one or more subjects and the identified context of the first image of the one or more captured images containing the one or more subjects are determined using a regression analysis.

13. The computer program product of claim 8, wherein the social networking histories and relationships of the one or more subjects and the identified context of the first image of the one or more captured images containing the one or more subjects are determined by analyzing the history of the one or more identified subjects using one or more past social network posts in one or more similar situations.

14. The computer program product of claim 8, wherein the one or more subjects are selected from a group consisting of: one or more users, one or more people, one or more places, one or more objects, and any combination of the one or more people, the one or more places, and the one or more objects.

15. A computer system for managing captured images and captions using deep machine learning, the computer system comprising:
one or more computer processors;
one or more computer readable storage devices;
program instructions stored on the one or more computer readable storage devices for execution by at least one of the one or more computer processors, the stored program instructions comprising:
program instructions to receive one or more captured images of one or more subjects, wherein a first image of the one or more images includes one or more subjects;
program instructions to identify the one or more subjects from the first image;
program instructions to identify a social and emotional context of the first image of the one or more captured images containing the one or more subjects;
program instructions to analyze one or more social networking histories and relationships associated with the one or more subjects using facial recognition techniques and object recognition techniques;
program instructions to identify the relationship between the one or more identified subjects and a tone of the first image, wherein the tone is based on the social and emotional context of the first image;
program instructions to perform regression analysis on the identified relationship to categorize the relationship between one or more identified subjects and the tone for the image; and
program instructions to create one or more captions associated with the first image of the one or more captured images based on the social networking histories and relationships of the one or more subjects and the identified context of the first image of the one or more captured images containing the one or more subjects and the performed regression analysis.

16. The computer system of claim 15, further comprising:
program instructions to determine whether permission exists to upload the first image of the one or more captured images of one or more subjects from the first image and the one or more captions associated with the first image of the one or more captured images to one or more networks.

17. The computer system of claim 16, further comprising:
responsive to determining that permission to upload the first image of the one or more captured images of the one or more subjects from the first image and the one or more captions associated with the first image of the one or more captured images does exist, program instructions to upload the first image of the one or more captured images of the one or more subjects from the first image and the one or more captions associated with the first image of the one or more captured images to relevant social networks.

18. The computer system of claim 15, wherein the social networking histories and relationships of the one or more subjects and the identified context of the first image of the one or more captured images containing the one or more subjects are determined using a supervised learning classifier.

19. The computer system of claim 15, wherein the social networking histories and relationships of the one or more subjects and the identified context of the first image of the one or more captured images containing the one or more subjects are determined using a regression analysis.

20. The computer system of claim 15, wherein the social networking histories and relationships of the one or more subjects and the identified context of the first image of the one or more captured images containing the one or more subjects are determined by analyzing the history of the one or more identified subjects using one or more past social network posts in one or more similar situations.

* * * * *